(12) United States Patent
Ikuta et al.

(10) Patent No.: US 6,376,580 B1
(45) Date of Patent: Apr. 23, 2002

(54) CEMENT RETARDER AND CEMENT RETARDATIVE SHEET

(75) Inventors: Toru Ikuta, Kobe; Hiroaki Arita, Himeji, both of (JP)

(73) Assignee: Daicel-Huels Ltd., Tokyo (JP)

( * ) Notice: Subject to any disclaimer, the term of this patent is extended or adjusted under 35 U.S.C. 154(b) by 0 days.

(21) Appl. No.: 09/290,549

(22) Filed: Apr. 12, 1999

Related U.S. Application Data

(62) Division of application No. 08/899,167, filed on Jul. 23, 1997.

(30) Foreign Application Priority Data

Aug. 6, 1996 (JP) .............................................. 8-207227

(51) Int. Cl.$^7$ ................................................ C08K 3/00
(52) U.S. Cl. ........................... 524/5; 428/543; 428/702; 428/703
(58) Field of Search .............................. 524/5; 428/702, 428/703, 543

(56) References Cited

U.S. PATENT DOCUMENTS

| | | |
|---|---|---|
| 2,790,724 A | 4/1957 | Bergman |
| 4,050,943 A | 9/1977 | Sondhe |
| 4,946,904 A * | 8/1990 | Akimoto et al. ......... 525/327.8 |
| 5,236,975 A | 8/1993 | Sekine |
| 5,264,470 A | 11/1993 | Eoff |

FOREIGN PATENT DOCUMENTS

| | | |
|---|---|---|
| EP | 0401051 A2 | 12/1990 |
| EP | 0537872 A1 | 4/1993 |
| EP | 0633390 A1 | 1/1995 |
| EP | 0641746 A2 | 3/1995 |
| EP | 0754656 A1 | 1/1997 |
| FR | 2273677 | 2/1976 |
| JP | 4871412 | 9/1973 |
| JP | 54141020 | 11/1979 |
| JP | 1172250 A | 7/1989 |
| JP | 6047725 | 2/1994 |

* cited by examiner

*Primary Examiner*—Bernard Lipman
(74) *Attorney, Agent, or Firm*—Birch Stewart Kolasch & Birch, LLP

(57) ABSTRACT

A polymer comprising an anionic group (e.g. an acid anhydride group, a carboxyl group) and a hydrophilic segment (e.g. a polyoxyalkylene ether unit) is used as a cement retarder. The polymer is obtainable by copolymerization of a monomer including maleic anhydride with a monomer including a vinylalkyl ether-series monomer in which an alkylene oxide is added to allyl alcohol. The polymer may be a copolymer copolymerized with other monomers such as styrene. Use of this cement retarder can provide patterns or washing-finished face on the surface of a concrete product. The cement retarder is suitable for application for a cement retardative sheet.

7 Claims, No Drawings

CEMENT RETARDER AND CEMENT RETARDATIVE SHEET

This application is a divisional of copending application Ser. No. 08/899,167, filed on Jul. 23, 1997, the entire contents of which are hereby incorporated by reference.

FIELD OF THE INVENTION

The present invention relates to a cement retarder (a cement-hardening retardant), a method for retarding the hardening or setting of a cement using the cement retarder, a cement retardative sheet as produced using the retarder, a decorative (dressing) kit sheet comprising the cement retardative sheet, and a method for producing a dressing-finished concrete product with using the cement retardative sheet or the decorative kit sheet.

BACKGROUND OF THE INVENTION

A cement retarder is a kind of a cement admixture (a cement additive) and used for retardation of a hydration reaction of a cement, thereby retarding the setting or hardening of a mortar or concrete.

As disclosed in Japanese Patent Application Laid-open No. 172250/1989 (JP-A-1-172250), conventional cement retarders can be roughly classified into two categories, organic cement retarders and inorganic cement retarders. The inorganic retarders include lead oxide, boron oxide, borax, zinc chloride, zinc oxide, magnasium silicofluoride and the like. The organic retarders include sugar, a salt of an oxycarboxylic acid, a salt of lignosulfonic acid, gluconic acid or its salt, pyruvic acid, α-ketoglutaric acid and other keto acids and so on. These cement retarders are used mainly for longer hours of transportation of ready-mixed concrete in the summer season and for mitigation of stress in a large-sized concrete structure due to the retained heat.

The surfaces of concrete products and various buildings are frequently decorated by means of washing (washing finish) technology of plastering technologies. The washing finish technology comprises washing a surface of a concrete product with water just before the hardening of a cement, so that the mortar on the concrete surface can be washed out, thereby exposing a part of aggregates on the surface. The washing operation has to be carried out in a strictly limited time period, because the timing for the washing operation is closely linked to the rate of the concrete hardening.

Concrete products produced by the precast technology are prevailing these days, and a wall member (a wall material), a concrete slab for pavement decoration and the like decorated by washing-finishing are manufactured in the factories. Regrettably, it is difficult to conduct a timely washing operation, although the rationalisation of production steps is of significant importance for this industry. Therefore, it is advantageous if the moulding step of the concrete slab and the washing step of the cement can be separated, so that the washing step can be operated irrespective of the hardening or setting degree of the cement.

By applying a cement-hardening retarder, which is a kind of a cement admixture (a cement additive), on the surface of a concrete product for retardation of the hardening of the concrete surface layer, the concrete surface can be washed out for decoration, regardless of the hardening rate of the cement. By way of illustration, Japanese Patent Application Laid-open No. 47725/1994 (JP-A-6-47725) suggests a process which comprises the steps of coating the inner surface of a mould with an aqueous solution containing a conventional cement retarder and a thickener in advance, depositing (casting) a concrete in the mould, removing the hardened article therefrom and washing out the surface of the article. Japanese Patent Application Laid-open No. 71412/1973 (JP-A-48-71412) and Japanese Patent Application Laid-open No. 141020/1979 (JP-A-54-141020) disclose the use of a conventional cement retarder which is impregnated in a sheet or paper.

The above cement retarders serve for retardation of cement hardening, the effect of which is lost in a relatively short period. It is, therefore, difficult to improve the productivity of a concrete product by separating the washing step completely from the cement moulding step.

SUMMARY OF THE INVENTION

It is therefore an object of the present invention to provide a cement retarder (a cement-hardening retardant) whose high hardening-retarding properties (hardening-retardancy) can last for a long period, and a method for retarding the hardening or setting of a cement using this cement retarder.

Another object of the present invention is to provide a cement retarder which insures precise formation of decorative patterns on the surface of a concrete product by means of the washing-finish technology, and a method for retarding the hardening or setting of a cement using this cement retarder.

It is a further object of the present invention to provide a cement retardative sheet (a cement-hardening retarding sheet) which can retain high hardening-retarding properties or hardening-retardancy for a prolonged period of time and be useful for formation of decorative patterns on a predetermined position.

Another object of the present invention to provide a decorative (dressing) kit sheet used for simple and precise formation of a decorative pattern at a predetermined position.

Yet another object of the present invention is to provide a method for producing a dressing-finished (faced) concrete product (a decorated concrete product), which method insures excellent productivity, and according to which a decorative pattern is formable with high precision on the surface of the concrete product.

The inventors of the present invention have been devoted to the realisation of the above objects, and found that a cement retarder comprising a copolymer (a macromolecule) of plural specific components not only exhibits improved hardening-retardancy for a cement for a long period, but also prevents fluidisation or washout of the cement retarder by water. The present invention is based on the above findings.

The cement retarder of the present invention comprises a polymer having an anionic group which can form a chelate with a divalent metal ion and a hydrophilic segment. The anionic group of the cement retarder may comprise at least one species selected from the group consisting of an acid anhydride group, a carboxyl group and a sulfonic acid group, e.g. a succinic acid residue. The hydrophilic segment includes a segment represented by the formula —O—$(R^1O)_n$—$R^2$, for instance, a segment comprising a (poly)oxy-$C_{2-4}$ alkylene unit, wherein $R^1$ represents a $C_{2-4}$ alkylene group, and $R^2$ stands for a hydrogen atom, an alkyl group, a cycloalkyl group, an aryl group, an aralkyl group or an acyl group, n being an integer of 0 to 100.

The polymer constituting the cement retarder may be a copolymer of a monomer mixture containing a polymerizable compound having the anionic group and a polymerizable compound having the hydrophilic segment. The polymerizable compound having the anionic group may not necessarily be a polymerizable monomer having the anionic group, but also be a polymerizable monomer which can generate the anionic group, a polymerizable macromolecule having the anionic group or a polymerizable macromolecule which can generate the anionic group. The copolymer may be either of a copolymer having a polymerizable monomer unit having an acid anhydride group or a carboxyl group and a polymerizable monomer unit having a (poly)oxyalkylene segment, or a copolymer having a unit of maleic acid, its ester or maleic anhydride and a polymerizable monomer unit having a (poly)oxyalkylene segment. The copolymer may further have another copolymerizable monomer unit.

The method of the present invention also includes a method for retarding (hindering) the hardening of a cement by using a polymer comprising an anionic group which can form a chelate with a divalent metal ion, and a hydrophilic segment.

The present invention further includes a cement retardative sheet, at least one surface of which is applied (coated or impregnated) with the cement retarder. This cement retardative sheet may comprise a sheet formed with the cement retarder, or a sheet comprising a base sheet containing (retaining or holding) the cement retarder. The surface of the cement retardative sheet may be imparted with tacky adhesive (pressure-sensitive adhesive) properties.

The decorative kit sheet of the present invention is constituted with the cement retardative sheet which has a tacky adhesive surface and a plurality of decorative members fixed on the tacky adhesive surface of the stated cement retardative sheet.

The process for producing the dressing-finished (faced) concrete product of the present invention comprises the steps of:

- arranging decorative (dressing) members (1) by laying the cement retardative sheet having a tacky adhesive surface in a mould with the tacky adhesive side facing upwards, and pasting or fixing the front faces (surfaces) of plural decorative members onto the tacky adhesive surface, or (2) by laying the decorative kit sheet provided with decorative members fixed thereon in the mould so that the reverse sides (back) of the decorative members face upwards,
- casting and curing an inorganic hardenable composition in the mould,
- removing the hardened article out of the mould and then removing the tacky adhesive sheet so that the surfaces of the decorative members can be exposed, and
- washing the surfaces of the decorative members with water.

In this specification, it should be understood that the term "cement" includes both "concrete" and "mortar," unless otherwise specified. The terms "polymer" and "macromolecule" include an oligomer having a relatively low molecular weight as well as a polymer having a large molecular weight.

DETAILED DESCRIPTION OF THE INVENTION

The cement retarder (the cement-hardening retardant) of the present invention comprises a polymer having an anionic group and a hydrophilic segment.

The species of the anionic group is not specifically limited as far as the anionic group being chelate-formable (chelate-bondable) with a divalent metal ion (e.g. calcium, magnesium), but the anionic group is chelate-formable (chelate-bondable) with a calcium ion, a principle component of the cement. A functional group constituting the anionic group includes an acid anhydride group, a carboxyl group, a sulfonic acid group and the like. The cement retarder may have two or more of these functional groups. A desirable anionic group is constituted with an acid anhydride group or a carboxyl group. If a pair of chelate-formable anionic groups (e.g. carboxyl groups) are present in one and the same molecule, it is preferable that 1 to 3 carbon atoms, above all 2 or 3 carbon atoms, lie between the anionic groups. In the present invention, the anionic group also includes a group which develops the chelate-forming properties by hydrolysis.

The preferable anionic group is a succinic acid residue shown by the following formula (i).

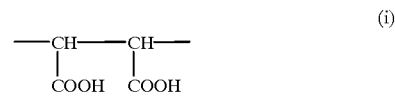
(i)

The hydrophilic segment includes a segment shown by the following formula (ii),

(ii)

wherein $R^1$ represents a $C_{2-4}$ alkylene group, and $R^2$ stands for a hydrogen atom, an alkyl group, a cycloalkyl group, an aryl group, an aralkyl group or an acyl group, n being an integer of 0 to 100. In the present invention, the hydrophilic segment further includes a segment which can develop hydrophilic properties by hydrolysis with alkali.

A more preferable hydrophilic segment has a structure shown by the following formula (iii),

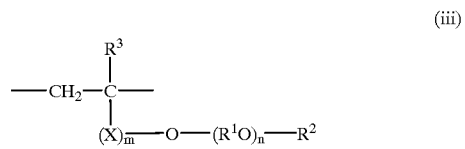
(iii)

wherein $R^3$ represents a hydrogen atom or a methyl group, X represents a straight-chain or branched-chain alkylene group having 1 to 10 carbon atoms or a carbonyl group, and m is 0 or 1, with $R^1$, $R^2$ and n having the same meanings as above.

The alkylene group represented by $R^1$ includes a $C_{2-4}$ alkylene group such as ethylene, propylene and tetramethylene groups, among which an ethylene group and a propylene group are preferred. The species of the alkylene group and the repeating number n can control not only the hydrophilic property but also the water-solubility of the copolymer. It is advantageous for the alkylene group to comprise, or at least to contain, the propylene group in order to give a water-insoluble copolymer.

A desirable example of the oxyalkylene unit $(R^1O)_n$ includes a polyoxyalkylene unit, and above all, a polyoxy-$C_{2-4}$ alkylene unit (e.g. polyoxyethylene, polyoxypropylene, polyoxytetramethylene units). A desirable hydrophilic segment includes a polyoxy-$C_{2-3}$ alkylene unit such as a polyoxyethylene unit, an oxyethylene-oxypropylene random copolymer unit, a polyoxyethylene-polyoxypropylene block copolymer unit and so on.

As the alkyl groups represented by $R^2$, there may be mentioned, for instance, methyl, ethyl, propyl, isopropyl, butyl, hexyl, octyl, decyl, dodecyl (lauryl), tetradecyl (myristyl), hexadecyl (palmityl), octadecyl (stearyl) and other $C_{1-20}$ alkyl groups. As the cycloalkyl groups, there may be exemplified cyclobutyl, cyclopentyl, cyclohexyl, cycloheptyl, cyclooctyl and other $C_{3-10}$ cycloalkyl groups. The aryl group includes, in addition to $C_{6-10}$ aryl groups such as a phenyl group and a naphthyl group, $C_{6-10}$ aryl groups having a substituent (e.g. a phenyl group having a $C_{1-20}$ alkyl group such as a methyl, ethyl, butyl, hexyl, octyl, nonyl, decyl, dodecyl, tetradecyl, hexadecyl or octadecyl group). As the aralkyl groups, there may be mentioned benzyl, phenetyl, benzhydryl and other $C_{7-10}$ aralkyl groups. As the acyl groups, there may be exemplified formyl, acetyl, propionyl, acryloyl, butyryl, iso-butyryl, valeryl, isovaleryl, hexanoyl and other $C_{1-10}$ aliphatic acyl groups (among them, a $C_{1-5}$ aliphatic acyl group); cyclohexanecarbonyl and other $C_{4-9}$ alicyclic acyl groups; and benzoyl, toluyl, naphthoyl and other $C_{6-15}$ aromatic acyl groups.

The solubility of the polymer in water can be regulated by the species of $R^2$, although the solubility also depends on the species of $R^1$ and the repeating number n. When $R^2$ is the $C_{10-20}$ alkyl group, the cycloalkyl group, the aryl group or the substituted aryl group, or the aralkyl group, the copolymer is likely to be insoluble in water.

The straight-chain or branched-chain alkylene group having 1 to 10 carbon atoms as shown by X includes methylene, ethylene, propylene, dimethylmethylene, butylene and hexylene groups. A favourable alkylene group is a $C_{1-4}$ alkylene group, preferably a $C_{1-3}$ alkylene group, and, above all, a methylene group ($-CH_2-$).

The letter m denotes either 0 or 1 in the formula (iii). The formula corresponds to a residue of a vinyl ether-series monomer with m being 0. The formula represents a residue of a vinyl alcohol-series or vinyl ester-series monomer, provided that m=n=0 and that $R^2$ is a hydrogen atom or an acyl group. Provided that m equals 1 and that X is an alkylene group, the formula corresponds to a residue of a vinylalkyl ether-series monomer (e.g. a residue of an allyl ether-series monomer). Provided that m=1, n=0 and that $R^2$ represents a hydrogen atom or an acyl group, the formula represents a residue of a vinylalkyl alcohol-series or vinylalkyl ester-series monomer. Provided that m equals 1 and that X is a carbonyl group (C=O), the formula corresponds to a residue of a (meth)acrylic monomer. It is desirable that m equals 0, or otherwise, that X is a $C_{1-3}$ alkylene group (particularly, a methylene group) if m equals 1.

The repeating number n of the oxyalkylene unit can be selected from a range of about 0 to 100 (e.g. 1 to 100), preferably about 2 to 75 (e.g. 2 to 50), and more preferably about 3 to 50.

The polymer comprising the anionic group and the hydrophilic segment may be a polyethylene-series or polypropylene-series graft copolymer which has a polyoxyalkylene ether unit, and a carboxyl group or an acid anhydride group respectively in the side chain.

A preferable polymer can be constituted with a polymerizable monomer having the anionic group (e.g. a polymerizable monomer having an acid anhydride group or a carboxyl group) and a polymerizable monomer having the hydrophilic segment (e.g. a polymerizable monomer having a polyoxyalkylene segment). The polymerizable compound having the anionic group may be a polymerizable monomer having the anionic group, or may be a polymerizable macromolecule which generates the anionic group or a polymerizable macromolecule having the anionic group.

The polymerizable monomer containing the anionic group includes, for instance, a polymerizable unsaturated monomer having a carboxyl group (e.g. ethylenically unsaturated monocarboxylic acids such as (meth)acrylic acid and crotonic acid; unsaturated polycarboxylic acids such as maleic acid, fumaric acid and itaconic acid; mono-$C_{1-10}$ alkyl esters of an unsaturated polycarboxylic acid such as monobutyl maleate and monooctyl maleate); a polymerizable unsaturated monomer having an acid anhydride group (e.g. maleic anhydride, itaconic anhydride); and a polymerizable unsaturated monomer having a sulfonic acid group (e.g. 2-sulfoethyl (meth)acrylate, vinyl sulfonic acid, styrene sulfonic acid). The polymerizable monomer having the anionic group may also be a derivative which generates the anionic group by hydrolysis. Such a derivative includes a di-$C_{1-10}$ alkyl ester of an unsaturated polycarboxylic acid [e.g. an unsaturated polycarboxylic acid di-$C_{1-4}$ alkyl ester, and particularly, a maleic acid ester (e.g. diethyl maleate, dibutyl maleate, dioctyl maleate), a (meth)acrylic acid $C_{1-10}$ alkyl ester, particularly, a (meth)acrylic acid $C_{1-4}$ alkyl ester]. These monomers can be used alone or in combination.

Examples of the preferred polymerizable monomer having the anionic group include (meth)acrylic acid and other carboxyl group-containing monomers, maleic acid, maleic anhydride and other unsaturated polycarboxylic acids or their acid anhydrides, or their derivatives. Maleic acid, fumaric acid, maleic anhydride and their derivatives are particularly preferred among them.

As the polymerizable macromolecules which generate the anionic group, there may be exemplified oligomers or polymers each generating a carboxyl group or a sulfonic acid group by hydrolysis or the like, such as (i) an unsaturated polyester generated by esterification of maleic anhydride with a $C_{2-4}$ alkylene glycol or a (poly)oxy-$C_{2-4}$ alkylene glycol, and (ii) a copolymer of a polymerizable compound which generates a carboxyl group or the like by hydrolysis (e.g. a (meth)acrylic acid alkyl ester, a maleic acid alkyl ester, a fumaric acid alkyl ester) with a diene component (e.g. aliphatic dienes such as butadiene and isoprene, cyclic dienes such as dicyclopentadiene). In the case where an unsaturated polyester is employed as the polymerizable macromolecule generating the anionic group, it is desirable to employ a polymerizable monomer with a repeating number n of the oxyalkylene unit of 2 or more (from 2 to 75, preferably from 2 to 50, and more preferably from 3 to 50) as the polymerizable monomer having the hydrophilic segment. The polymerizable macromolecule having the anionic group includes a copolymer of a polymerizable compound having a carboxyl group (e.g. (meth)acrylic acid, maleic acid, fumaric acid) and the diene component described above.

The content of the anionic group, which includes the generated anionic group, can be selected according to the species of the functional group from a range where the cement retardative effect can be guaranteed. The amount of the anionic group is, for instance, about 0.1 to 17 millimoles/g (e.g. 1 to 15 millimoles/g) and preferably about 1 to 13 millimoles/g (e.g. 5 to 10 millimoles/g) in a cement retarder comprising the polymer.

The polymerizable monomer having the hydrophilic segment includes a polymerizable monomer having a hydrophilic segment such as a (poly)oxyalkylene segment (n=1 to 100) shown by the following formula (iv),

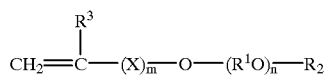

(iv)

wherein each of $R^1$, $R^2$, $R^3$, X, m and n has the same meaning as defined above.

Among the polymerizable monomers shown by the above formula (iv), examples of a vinyl ether-series monomer (a compound represented when m equals 0) include (poly) oxyalkylene glycol monovinyl ethers (e.g. oxyethylene glycol monovinyl ether, dioxyethylene glycol monovinyl ether, trioxyethylene glycol monovinyl ether, tetraoxyethylene glycol monovinyl ether, polyoxyethylene glycol monovinyl ether, dioxypropylene glycol monovinyl ether, trioxypropylene glycol monovinyl ether, tetraoxypropylene glycol monovinyl ether, polyoxypropylene glycol monovinyl ether), and the above-mentioned monovinyl ethers whose terminal hydroxyl group is blocked with any of a $C_{1-20}$ alkyl group, a $C_{3-10}$ cycloalkyl group, a $C_{6-10}$ aryl group optionally having a $C_{1-20}$ alkyl group, or a $C_{7-10}$ aralkyl group (e.g. a $C_{6-20}$ alkyl-polyoxyethylene monovinyl ether, a p-$C_{6-20}$ alkylphenyl-polyoxyethylene monovinyl ether).

As the vinyl ester-series monomers (a compound represented when m=n=0 and $R^2$ is an acyl group), there may be mentioned vinyl acetate, vinyl propionate and other $C_{1-5}$ aliphatic carboxylic acid vinyl esters. The ester group in the vinyl ester-series monomer unit develops hydrophilic properties by being hydrolysed with an alkali component in a cement. The vinyl ester-series monomer is convertible into a vinyl alcohol monomer (m=n=0, $R^2$ is a hydrogen atom) unit if saponified after polymerization.

Examples of a vinyl alkyl ether such as an allyl ether derivative (a compound represented when X is an alkylene group and m equals 1) include (poly)oxyalkylene glycol monovinylalkyl ethers (e.g. oxyethylene glycol monovinyl alkyl ether, dioxyethylene glycol monovinyl alkyl ether, trioxyethylene glycol monovinyl alkyl ether, tetraoxyethylene glycol monovinyl alkyl ether, polyoxyethylene glycol monovinyl alkyl ether, dioxypropylene glycol monovinyl alkyl ether, trioxypropylene glycol monovinyl alkyl ether, tetraoxypropylene glycol monovinyl alkyl ether, polyoxypropylene glycol monovinyl alkyl ether), and the above-mentioned monovinyl alkyl ethers whose terminal hydroxyl group is blocked with any of a $C_{1-20}$ alkyl group, a $C_{3-10}$ cycloalkyl group, a $C_{6-10}$ aryl group optionally having a $C_{1-20}$ alkyl group, a $C_{7-10}$ aralkyl group or a $C_{1-10}$ aliphatic acyl group (e.g. a $C_{6-20}$ alkyl-polyoxyethylene monovinyl alkyl ether, a p-$C_{6-20}$ alkylphenyl-polyoxyethylene monovinyl alkyl ether).

As the vinylalkyl alcohol-series or vinylalkyl ester-series monomers ($R^2$ is a hydrogen atom or an acyl group; m=1 and n=0), there may be mentioned an allyl alcohol or its ester (e.g. a $C_{1-5}$ aliphatic carboxylic acid allyl ester such as allyl acetate and allyl propionate) and the like. The ester group of the vinylalkyl ester-series monomer unit develops hydrophilic properties by being hydrolysed with an alkali component in a cement.

Examples of a (meth)acrylic monomer (a compound represented when X is CO and m is 1) include, $C_{2-6}$ alkylene glycol mono(meth)acrylates [e.g. $C_{2-4}$ alkylene glycol mono(meth)acrylates such as 2-hydroxyethyl (meth)acrylate, 2-hydroxypropyl (meth)acrylate and 1,4-butanediol mono (meth)acrylate], polyoxyalkylene glycol mono(meth) acrylates [e.g. dioxyethylene glycol mono(meth)acrylate, trioxyethylene glycol mono(meth)acrylate, tetraoxyethylene glycol mono(meth)acrylate, polyoxyethylene glycol mono (meth)acrylate, dioxypropylene glycol mono(meth)acrylate, trioxypropylene glycol mono(meth)acrylate, tetraoxypropylene glycol mono(meth)acrylate, polyoxypropylene glycol mono(meth)acrylate], and the above-mentioned mono (meth)acrylates whose terminal hydroxyl group is blocked with any of a $C_{1-20}$ alkyl group, a $C_{3-10}$ cycloalkyl group, a $C_{6-10}$ aryl group optionally having a $C_{1-20}$ alkyl group, a $C_{7-10}$ aralkyl group, or a $C_{1-10}$ aliphatic acyl group [e.g. a $C_{6-20}$ alkyl-polyoxyethylene mono(meth)acrylate, a p-$C_{6-20}$ alkylphenyl-polyoxyethylene mono(meth)acrylate]. Among the (meth)acrylic monomers, monomers of n=0 include (meth)acrylic acid, its ester [e.g. a (meth)acrylic acid $C_{1-4}$ alkyl ester] and the like. The ester group in the (meth)acrylic acid ester monomer unit is hydrolysed with an alkali component in a cement to show hydrophilic properties.

Desired polymerizable monomers having the hydrophilic segment include the vinyl ether-series monomer and the vinylalkyl ether-series monomer each having the (poly) oxyalkylene segment (especially, a compound wherein an alkylene oxide is added to allyl alcohol, a derivative wherein the terminal hydroxyl group of the above compound is blocked and other allyl alcohol-series monomers). The polymerizable monomer having the hydrophilic segment can be used alone or in combination.

Preferred copolymers for constituting the cement retarder include a copolymer which has a polymerizable monomer unit having an acid anhydride group or a carboxyl group and a polymerizable monomer unit having the (poly) oxyalkylene segment, and specifically a copolymer which has a unit of maleic acid or its ester or a maleic anhydride unit and a polymerizable monomer unit having the (poly) oxyalkylene segment shown by the formula (iv).

Particularly preferred copolymers include a copolymer comprising at least a maleic acid or maleic anhydride unit, and a unit of a vinyl ether-series monomer or a vinylalkyl ether-series monomer having the (poly)oxyalkylene segment. The preferred copolymer may be a copolymer comprising a (meth)acrylic monomer unit.

The copolymer may also further comprise a unit of other copolymerizable monomers. As such copolymerizable monomers, there may be mentioned, for example, olefins (e.g. ethylene, propylene, butene), diene monomers (e.g. butadiene, isoprene), (meth)acrylonitriles, aromatic vinyl compounds (e.g. styrene, α-methylstyrene, p-methylstyrene, vinyl toluene) and so on. These co-polymerizable monomers can be used independently or in combination.

As additionally preferable copolymerizable monomers, there may be mentioned a monomer having a high copolymerizable property with maleic acid or its derivative, or maleic anhydride, specifically an aromatic vinyl compound such as styrene.

A favourable copolymer has a structural unit shown by the following formula (v),

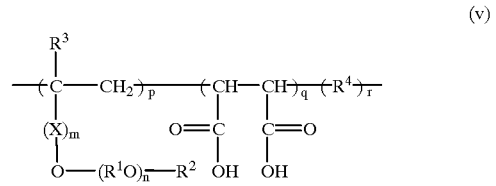

(v)

wherein $R^4$ represents a residue of a vinyl monomer, and p+q+r=1, p being 0.1 to 0.9, q being 0.1 to 0.9 and r being 0 to 0.5, and wherein $R^1$, $R^2$, $R^3$, X, m and n have the same meanings as defined above.

It is advantageous for the polymer which constitutes the cement retarder to be substantially insoluble in water in order to prevent dissolution by water. The coefficients p, q and r can be selected from a range where a water-insoluble polymer is formable, preferable coefficients p and q being in the range of about 0.2 to 0.8, particularly about 0.3 to 0.7, while a preferable coefficient r being about 0 to 0.4, particularly about 0 to 0.3.

The molecular weight of the cement retarder constituted with the above polymer is not strictly restricted. For example, the number-average molecular weight measured by gel permeation chromatography (GPC) is about 200 to 100,000 (e.g. 500 to 100,000), preferably about 1,000 to 70,000 (e.g. 2,000 to 70,000), and more preferably about 5,000 to 50,000.

This kind of the cement retarder shows high and stable hardening-retardative properties for a prolonged period. The reason for this effect is presumed that the cement components including a calcium ion which hardens a cement through a hydration reaction are trapped with the anionic group of the polymer, while the hydrophilic segment of the polymer retains the hydrophilic properties.

The cement retarder (the cement-hardening retardant) of the present invention may be constituted with the polymer alone, or may be mixed or compounded with another resin, for which a film-formable resin is desirable. As such resins, there may be mentioned thermoplastic resins [e.g. polyethylene, polypropylene and other olefinic polymers; poly(ethylene terephthalate), poly(butylene terephthalate), poly(1,4-dimethylol-cyclohexane terephthalate) and other polyesters; nylon 46, nylon 6, nylon 66, nylon 610, nylon 612, nylon 11, nylon 12 and other polyamides; poly(vinyl acetate), an ethylene-vinyl acetate (EVA) copolymer, a vinyl acetate-vinyl vasaticate copolymer (VA-VeoVa) and other vinyl ester-series resins; poly(vinyl alcohol), an ethylene-vinyl alcohol copolymer and other saponified products of vinyl ester-series resins; an ethylene-ethyl acrylate copolymer, an ethylene-(meth)acrylic acid copolymer; poly (vinyl chloride), a vinyl chloride-vinyl acetate copolymer, a vinylidene chloride-vinyl acetate copolymer, polychloroprene, chlorinated polypropylene and other halogen-containing polymers; an acrylic resin, a styrene-(meth)acrylic acid ester copolymer and other acrylic polymers; polystyrene, a styrene-acrylic acid ester copolymer, an acrylonitrile-styrene copolymer (AS resin), a styrene-butadiene copolymer (SB resin), a styrene-butadiene-acrylonitrile copolymer (ABS resin) and other styrenic polymers; polycarbonates; methyl cellulose, ethyl cellulose, hydroxyethyl cellulose, cellulose acetate, acetyl butyl cellulose, nitro cellulose and other cellulosic polymers; a naturally-occurring rubber, a chlorinated rubber, a hydrochlorinated rubber, a butadiene rubber, an isoprene rubber, a styrene-butadiene rubber, an acrylonitrile-butadiene rubber, a butyl rubber, a chloroprene rubber, an ethylene-propylene rubber, an ethylene-propylene-non-conjugated diene rubber, an acrylic rubber, a chlorosulfonated polyethylene rubber, a silicon rubber, a urethane rubber and other elastomers; naturally-occurring polymers, etc.] and thermosetting resins (e.g. thermosetting acrylic resins, unsaturated polyester resins, vinyl ester resins, diallyl phthalate resins, epoxy resins, urea resins, phenol resins and so on). These resins may be used singly or in combination.

The proportion of the resin can be selected in a range not sacrificing the hardening-retardancy, and is, for instance, about 0 to 1,000 parts by weight, preferably about 0 to 700 parts by weight and more preferably about 0 to 500 parts by weight relative to 100 parts by weight of the cement retarder.

The cement retarder of the present invention may be employed in combination with other hardening retarders. Additionally, the cement retarder may comprise various additives such as a colouring agent including a pigment and a dye, an ultraviolet ray-absorber, an antioxidant and other stabilisers, a plasticiser, an antifoaming agent, an emulsifier, a filler and the like.

The cement retarder of the present invention is useful for precise formation of a predetermined pattern by washing-finish, but can also be used in the same applications as the conventional cement retarders. By way of illustration, the cement retarder may be added to a mortar or concrete for preventing the hardening of ready-mixed concrete for a long period in summer, or for obviating the stress brought about by the shifts of a temperature in large-sized concrete structures.

According to the present invention, the hardening or setting of the cement is retarded by utilising the cement retarder (the cement hardening retardant) comprising the aforesaid polymer as a cement retardative factor. The prevention of the hardening of the cement is effected by contacting the retarder with a cement, particularly with a composition comprising at least a cement and water. High retardative properties can be expected for a long period of time, as this process employs the stated cement retarder.

The cement retardative sheet of the present invention is provided with the above cement retarder on at least one side (surface) of the sheet. The cement retardative sheet (the cement hardening-retarding sheet) may comprise (1) a sheet composed of the cement retarder, or (2) a sheet comprising a base sheet at least one surface of which is applied with the cement retarder by coating and the like.

The cement retardative sheet (1) can be produced according to conventional moulding technologies including extrusion moulding, flow moulding, calender moulding and the like, with using a hardening-retardative resin composed of the polymer or a composition comprising of the cement retarder and a resin.

In the cement retardative sheet (2), the cement retarder comprising the polymer may be coated on or impregnated in the base sheet in a form melted by heat, or may be, whatever its form (e.g. solid), dissolved in an organic solvent for application. In the case of coating, the cement retarder need only be coated on at least one surface of the base sheet. The coating layer may be formed on the whole surface of the base sheet, or on a part of the surface (e.g. by forming regular patterns or irregular patterns). As the organic solvents, there may be exemplified alcohols such as ethanol and isopropanol; aliphatic hydrocarbons such as hexane; alicyclic hydrocarbons such as cyclohexane; aromatic hydrocarbons including benzene, toluene and xylene; halogenated hydrocarbons such as dichloromethane and dichloroethane; ketones such as acetone and methyl ethyl ketone; esters including ethyl acetate; ethers such as diethyl ether and tetrahydrofuran; and mixtures of these solvents.

The base sheet includes non-porous sheets such as a plastic sheet and a metal foil, and porous sheets such as paper and a woven or non-woven fabric, typically speaking. Among these base sheets, the preferred non-porous sheet includes a plastic sheet, and the desirable porous sheet includes a plastic non-woven fabric.

There is no particular restriction for the constitutive polymer of the base sheet. The polymer includes, for instance, polyethylene, polypropylene and other olefinic polymers; poly(ethylene terephthalate), poly(butylene terephthalate) and other polyesters (especially, a poly (alkylene terephthalate)); an ethylene-vinyl acetate copolymer, an ethylene-acrylic acid copolymer; acrylic resins; polystyrene; poly(vinyl chloride); polyamides; polycarbonates; poly(vinyl alcohol), an ethylene-vinyl alcohol copolymer and the like. These polymers can be used singly or in combination. The preferable base sheet includes a plastic sheet and non-woven fabric.

The base sheet may be either of a single sheet or a composite sheet produced by laminating plural layers, e.g. a composite sheet produced by laminating the polyethylene sheet or other sheets on one side or both sides of a cloth made of woven fibres such as a polyethylene fibre. The base sheet such as a plastic sheet may be either of a non-oriented sheet, or a monoaxially or biaxially oriented sheet. For a higher adhesive property, the surface of the base sheet may be subjected to a surface treatment such as flame treatment, corona discharge treatment and plasma treatment. The surface tension of the surface-treated base sheet may practically be not less than about 40 dyne/cm.

The thickness of the base sheet lies in the range where operability (workability) and mechanical strength are not adversely affected, and is, for instance, about 15 to 500 $\mu$m, preferably about 20 to 400 $\mu$m, and more preferably about 30 to 300 $\mu$m. The thickness may practically be about 50 to 300 $\mu$m.

This cement retardative sheet can be cut in an optional shape for application as a surface-decoration sheet. By way of example, a piece of the cement retardative sheet is pasted or fixed on an area of an inner wall or a bottom wall of the mould, where the pattern is to be washed out on the surface of the concrete product. A concrete is cast and set in the mould, which is removed after hardening. The unhardened or unset mortar on the surface of the concrete product, where the retardative sheet was fixed, is washed away to give a concrete product with surface decoration (surface dressing). Since the cement retarder is contained or retained in the base sheet, the retarder does not move or flow in casting a concrete. Besides, the cement retarder does not run or flow away due to bleed water, as the retarder has a limited solubility in water. As a result, decorative patterns such as letters and figures can be laid clearly and precisely on a predetermined area of the surface of a concrete product or building.

The cement retardative sheet may be whichever of a non-tacky adhesive (non-pressure sensitive adhesive) or non-adhesive sheet, or a tacky adhesive sheet which is made adhesive by incorporating a tacky adhesive agent or an adhesive agent (hereinafter simply referred to as "tacky adhesive") or by coating the tacky adhesive. The content of the tacky adhesive in the sheet is, relative to 100 parts by weight of the cement retarder (the cement hardening-retardative resin), about 10 to 500 parts by weight, preferably about 25 to 400 parts by weight, and more preferably about 50 to 300 parts by weight. The content may practically be about 25 to 250 parts by weight relative to 100 parts by weight of the cement retarder.

When the tacky adhesive layer or the adhesive layer is formed by coating, the thickness of the layer is selected from a range where the adhesive property to a tile or other decorative members is insured, while the hardening of the concrete is satisfactorily prevented. For instance, the thickness is about 0.1 to 50 $\mu$m (e.g. 1 to 50 $\mu$m), preferably about 1 to 40 $\mu$m, and more preferably about 2 to 30 $\mu$m, practically being about 2 to 25 $\mu$m.

When the surface of the cement retardative sheet has tacky adhesive properties (pressure-sensitive adhesive properties), the tacky adhesive surface may be covered with a releasable protective sheet or paper such as releasing paper.

Use of the hardening-retardative sheet which is imparted with tacky adhesive properties due to the tacky adhesive agent is effective for the production of a concrete product which has patterns, figures or a washed face on its surface and on which a decorative member is fixed in a body (in a mass). To give a specific example, the retardative sheet is laid in a mould with the adhesive surface facing upwards. The front faces of plural decorative or dressing members such as stones and tiles are disposed (stuck) onto the sheet, and thus the decorative members are fixed on a predetermined position. An inorganic hardenable composition is cast or deposited in the mould, which is hardened by curing or other conventional hardening methods and then the hardened article is taken out of the mould. By removing the retardative sheet and washing the revealed surface (the surface in contact with the sheet) of the decorative member with using water, pressurised water, jet flow or the like, the unhardened or unset composition adhering to the decorative member is easily removed. Removal of the tacky adhesive agent provides a concrete product on which cleaned decorative members are fixed (e.g. a dressed block, a precast concrete slab). If no decorative member is adhered to the tacky adhesive surface of the sheet, the washing process provides a pattern or washed-out surface where aggregates are exposed.

In the cement retardative sheet, the coating layer containing the cement retarder may be peelable from the base sheet. If this is the case, a washing-finished surface with a pattern, a figure or exposed aggregates is produced in the following process. A predetermined section or area of the coating layer is cut into a desired pattern and peeled off from the base sheet. The retardative sheet is laid down in a mould, into which an inorganic hardenable (curable) composition (e.g. a mortar composition) is cast or deposited. The surface of the cured and hardened concrete product in contact with the sheet was subjected to washing-finish, thus giving a washing-finished surface on which the intended decoration is exposed according to the section of the remaining coating layer (the layer not having been cut off or peeled off from the base sheet). In order to make the coating layer peelable, the surface of the base sheet may be left untreated, or may be treated with a releasing agent such as a wax, a higher fatty acid amide or a silicon oil. The surface tension of the base sheet is selected in relation to the adhesive strength of the coating layer within a range not losing the peeling properties of the coating layer. For instance, the surface tension of the base sheet is not higher than about 38 dyne/cm, preferably about 20 to 38 dyne/cm, and more preferably about 25 to 36 dyne/cm.

When the retardative sheet whose surface is imparted with tacky adhesive properties (e.g. a sheet provided with the coating layer or hardening retardative layer containing the tacky adhesive) is employed, a kit sheet where decorative materials are arranged or disposed beforehand on the tacky adhesive layer may be laid in the mould, instead of arranging the decorative materials therein. By way of illustration, a unit tile can be formed by laying side by side, or scattering, plural tiles as decorative materials onto the tacky coating layer in the surface direction. The plural tiles may practically be arranged adjacently (side by side) or with intervals in the surface direction (e.g. in a longitudinal direction, a transverse direction (cross direction), or in both longitudinal and transverse directions). The use of the decorative kit sheet insures an improved working efficiency, as this saves the process of arranging decorative members one by one into the mould, the tiresome process being replaced by a simple process of laying, in the mould, a decorative kit sheet prepared in another independent step.

As the decorative members,. use can be made of a variety of materials such as boulders or cobblestones, black stones, Teppei stones and other naturally-occurring stones, artificial stones and other stones, tiles and other ceramic materials, metallic materials, glass, wood, woven fabrics and others. The decorative material may be in the form of a flat plate, and the tile may be a mosaic tile or a divided tile. In the production of the concrete product, a reinforcing steel or other reinforcements (reinforcing materials) may be arranged in a mould, if necessary, for the casting or deposit of the inorganic hardenable composition.

The decorative kit film such as the unit tile is advantageous for the production of a precast concrete slab and other dressing-finished (faced) concrete products. A precast concrete slab decorated with a dressing member tightly adhered thereto is produced by the following procedures. A decorative kit sheet is disposed in the concrete casting mould, with the reverse surface (back) of the tile or other decorative members facing upwards. A concrete is cast and then cured. After the hardened article is taken out of the mould, the tacky adhesive sheet is removed, whereby the surface of the decorative member is exposed. The surface is washed with water in order to wash away the unhardened or unset inorganic hardenable composition (e.g. cement) which has reached the surface of the decorative member, thus giving the precast concrete slab provided with a decorative or dressing member fixed thereon. According to this process, even when the inorganic hardenable composition has reached the surface of the tile or the decorative member, its hardening can be prevented owing to the action of the cement retarder. Since the inorganic hardenable composition remains to be unhardened (partially hardened or not hardened at all), the surface-finishing of the decorative member for removal of the inorganic hardenable composition is conducted efficiently and perfectly in a simple washing operation such as washing with water.

The cement includes, for instance, an air-hardening cement (e.g. gypsum (plaster), slaked lime, dolomite plaster and other limes) and a hydraulic cement (e.g. Portland cement, high-early-strength Portland cement, alumina cement, rapid-hardening high-strength cement, calcined gypsum and other self hardening cements; lime slag cement, blast-furnace-cement; cement mixtures). The preferable cement includes gypsum, dolomite plaster and hydraulic cements, typically speaking.

The cement may be used as a paste composition (cement paste) with water, or used as a mortar composition or concrete composition containing sand, quartz sand, pearlite or other fine aggregates and/or coarse aggregates.

The paste composition and the mortar composition may contain, as necessary, any of various additives such as colouring agents, hardening agents, calcium chloride and other hardening accelerators, sodium naphthalenesulfonate and other water reducing agents, coagulants, carboxymethyl cellulose, methyl cellulose, poly(vinyl alcohol) and other thickeners, foaming agents, synthetic resin emulsions and other waterproof agents, plasticisers and so on.

The cement retarder and the cement retardative sheet of the present invention are useful for production of various concrete products such as a curtain wall, a wall member and other concrete panels (slabs) and concrete blocks, and above all, for the manufacture of dressing-finished concrete products (e.g. precast concrete slabs).

The cement retarder of the present invention, which comprises a polymer having the anionic group and the hydrophilic segment, insures high hardening-retarding properties (hardening-retardancy) for a long period of time. The elution of the retarder caused by water can be prevented by a proper selection of the anionic group and the hydrophilic segment. According to the hardening-retarding method using this cement retarder, decorative patterns can be formed on the surface of the concrete product with high precision by the washing-finish technology.

The cement retardative sheet (the cement hardening-retarding sheet) of the present invention is useful for the formation of a decorative pattern on a predetermined area of the concrete product.

EXAMPLES

The following examples are intended to describe the present invention in further detail and should by no means be interpreted as defining the scope of the invention.

Example 1

Fed in a reaction vessel containing 50 ml of benzene were maleic anhydride (35 g, 0.36 mole) and an allyl alcohol derivative ($CH_2$=$CHCH_2O(CH_2CH_2O)_5CH_3$, 86 g, 0.29 mole) in which 5 moles of ethylene oxide had been added to allyl alcohol and whose terminal hydroxyl group had been methyl-etherified, and azobisisobutyronitrile (90 mg). Just after polymerization began at 60° C., styrene (7.4 g, 0.07 mole) was added little by little to be polymerized. 24 hours of the polymerization reaction provided a solution of a copolymer having a number-average molecular weight of about 10,000.

Example 2

Without using styrene, maleic anhydride (35 g, 0.36 mole) and the allyl alcohol derivative (107 g, 0.36 mole) were polymerized in the same manner as in Example 1. A solution of a copolymer having a number-average molecular weight of about 10,000 was obtained.

Example 3

Except for using maleic anhydride (35 g, 0.36 mole), the allyl alcohol derivative as used in Example 1 (64 g, 0.21 mole) and styrene (14.9 g, 0.14 mole), the procedure of Example 1 was repeated, thereby providing a solution of a copolymer with a number average molecular weight of about 10,000.

Comparative Example 1

Without using maleic anhydride, a solution of a copolymer having a number average molecular weight of about 8,000 was obtained in the same manner as in Example 1.

Comparative Example 2

Without using the allyl alcohol derivative of Example 1, a solution of a copolymer having a number average molecular weight of about 8,000 was obtained in the same manner as in Example 1.

Comparative Example 3

Maleic anhydride (159.7 g) and propylene glycol (169.6 g) were fed in a reaction vessel. The reaction mixture was gradually heated to 200° C. and stirred for seven hours, with removing generated water out of the reaction system. An unsaturated polyester with a weight average molecular weight of about 500 was thus obtained.

A coating composition containing one of the resins obtained in the Examples and the Comparative Examples was applied to a polyethylene terephthalate film using a bar coater in a way that the dried coating layer would have a thickness of about 60 μm. The solvent was removed by air-drying.

The thus obtained cement retardative sheet was pasted on the bottom surface of a plastic tray, and a mortar was deposited therein. The surface of the hardened concrete, which was taken out of the mould after one day of hardening, was washed using water. The depth of the washed-out concave was measured with using a non-contact laser displacement meter. The depth of the concave on the concrete surface washed out after 10 days was also measured in the same manner.

The results are shown in Table 1.

TABLE 1

| | Washed-out depth (mm) | | | | | |
|---|---|---|---|---|---|---|
| | Ex. 1 | Ex. 2 | Ex. 3 | Comp Ex. 1 | Comp Ex. 2 | Comp Ex. 3 |
| After 1 day | 5.5 | 6.0 | 5.0 | 0.4 | 2.5 | 3.8 |
| After 10 days | 5.5 | 6.0 | 5.0 | 0.4 | 0.2 | 0.5 |

Example 4

Fed in an autoclave were 80 g of ethyl acrylate, 10.8 g of butadiene, 100 g of a solvent (benzene/ethyl acetate=60/40 (by weight)) and 0.1 g of a polymerization initiator (azobisisobutylonitrile). After the mixture was polymerized for 2.5 hours at 70° C., a mixture of 49 g of diethylene glycol allyl methyl ether [$CH_2=CHCH_2O(CH_2CH_2O)_2CH_3$] and 0.1 g of a polymerization initiator (azobisisobutylonitrile) was charged in the autoclave by dividing the mixture into three portions and adding each portion with an interval of 30 minutes. The mixture was stirred for 24 hours at 70° C. to give a solution of a polymer with a molecular weight of 12,000.

Example 5

To a mixture of 10 g (about 50 millimoles) of an allylated polyether (NOF Corporation, "UNIOX PKA-5001," molecular weight: about 200) and 25 g of ethyl acrylate (250 millimoles) was added a benzene solution (35 ml) containing 35 mg of a polymerization initiator (azobisisobutylonitrile). Polymerization was conducted at 70° C. for seven hours to give a solution of a polymer with a weight average molecular weight of about 15,000.

Example 6

To a mixture of maleic anhydride (35 g, 0.36 mole), 2-hydroxyethyl methacrylate (25 g, 0.192 mole) and styrene (15 g, 0.144 mole) was added a benzene solution (75 ml) containing 75 mg of a polymerization initiator (azobisisobutylonitrile). Polymerization was conducted at 70° C. for eight hours to give a solution of a polymer with a weight average molecular weight of about 20,000.

Example 7

Benzene (50 ml) containing a polymerization initiator (azobisisobutylonitrile, 90 mg) was added to a mixture of maleic anhydride (35 g, 0.36 mole) and allyl alcohol (16.8 g, 0.29 mole). Just after polymerization was started at 60° C., styrene (7.4 g, 0.07 mole) was added by degrees. A solution of a copolymer having a number average molecular weight of about 10,000 was obtained after 24 hours of polymerization.

Example 8

Maleic anhydride (6.05 g), vinyl acetate (14.0 g) and a polymerization initiator (azobisisobutylonitrile, 0.216 g) were fed in a glass ampoule (capacity about 0.50 cc), which was then sealed. Polymerization was carried out at 65° C. for 2.5 hours. The recovered polymerized product was dissolved in tetrahydrofuran (THF) at ambient temperature to give a solution with a polymer concentration of 25% by weight.

Comparative Example 4

Ethyl acrylate and butadiene were polymerized at 70° C. for 2.5 hours in the same manner as in Example 4. Without adding diethylene glycol allyl methyl ether, polymerization was continued as in Example 4 at 70° C. for 24 hours with heating and stirring.

Comparative Example 5

A mixture of 10 g of an allylated polyether (NOF Corporation, "UNIOX PKA-5001," molecular weight: about 200) and 25 g of ethyl acrylate was used without being subjected to polymerization.

Comparative Example 6

Without using maleic anhydride, polymerization was conducted in the same manner as in Example 6.

A coating composition containing one of the polymers obtained in Examples 4 to 8 and Comparative Examples 4 to 6 (the mixture in Comparative Example 5) was coated onto a polyethylene terephthalate film using a bar coater in a way that the dried coating layer would have a thickness of about 60 μm. The solvent was removed by air-drying. As to Example 8, the polymer solution was coated twice with being air-dried after the first coating in order to give a layer with a thickness of 60 μm.

The thus obtained cement retardative sheet was pasted on the bottom of a plastic tray, and a mortar was deposited therein. The surface of the hardened concrete, which was taken out of the mould after a day had passed, was washed with water. The depth of the washed-out concave was measured with using a non-contact laser displacement meter. The depth of the concave washed out after 10 days of hardening was also measured in the same manner.

The results are given in Table 2.

TABLE 2

| | Washed-out depth (mm) | | | | | | | |
|---|---|---|---|---|---|---|---|---|
| | Ex. 4 | Ex. 5 | Ex. 6 | Ex. 7 | Ex. 8 | Comp Ex. 4 | Comp Ex. 5 | Comp Ex. 6 |
| After 1 day | 2.5 | 4.0 | 5.0 | 4.0 | 2.0 | 0 | 0.2 | 0.5 |
| After 10 days | 2.5 | 4.0 | 5.0 | 4.0 | 2.0 | 0 | 0 | 0.1 |

Example 9

Maleic anhydride (3,452 g, 35.2 moles) and ethylene glycol (2,539 g, 40.9 moles) were charged in an autoclave (capacity 10 liters) equipped with a stirring blade, with an addition of a polymerization inhibitor (hydroquinone, 100 ppm) and a catalyst (tetra-n-butoxytitane, 50 ppm). The mixture was stirred under a nitrogen gas flow for removal of water generated during the reaction. The mixture at ambient temperature was heated up for three hours to 150° C. under atmospheric pressure. The temperature of the reaction mixture was further raised from 150° C. to 210° C. in 24 hours. The reaction was stopped at the end of the period, providing an oily unsaturated polyester resin (weight average molecular weight 2,250).

Seventy (70) parts by weight of polyethylene glycol monomethacrylate (NOF Corporation, "BLEMMER PE-90," average mole number of added ethylene oxide: about 2 moles), 10 parts by weight of styrene, 3 parts by weight of an organic peroxide (NOF Corporation, "PERBUTYL-O") and 1.5 part by weight of a crosslinking catalyst (cobalt naphthenate) were added to 100 parts by weight of the unsaturated polyester resin obtained as above. The mixture was mixed with stirring at a temperature of 80° C. to give a polymerizable composition.

The polymerizable composition was coated on a polyethylene terephthalate film (thickness 30 $\mu$m) to form a layer of about 60 $\mu$m using a bar coater. The coated film was passed through an oven at 150° C. for 30 seconds, whereby the film subjected to heat was hardened. Thus obtained was a cement retardative sheet.

Example 10

Except for using polyethylene glycol monoallyl ether (NOF Corporation, "UNIOX PKA-5001," avarage mole number of added ethylene oxide: 2 moles) instead of polyethylene glycol monomethacrylate, a polymerizable composition was prepared in the same manner as in Example 9. A cement retardative sheet was produced likewise with the use of this polymerizable composition.

Comparative Example 7

Without adding polyethylene glycol monomethacrylate to the unsaturated polyester resin, a cement retardative sheet was produced in the same manner as in Example 9.

Each of the retardative sheets (15 cm×15 cm) obtained in the Examples and the Comparative Examples was pasted onto the bottom surface of a plastic tray with the coating layer facing the upside. A mortar (Portland cement/sand/water=100/200/55 (by weight)) was deposited therein. The hardened concrete was removed from the mould after a day, the surface of which was washed with water. The depth of the washed-out concave was measured using a non-contact laser displacement meter. The washed-out depths on the concrete surface after 7 days and 30 days of hardening were measured likewise. The results are shown in Table 3.

TABLE 3

| | Washed-out depth (mm) | | |
|---|---|---|---|
| | Ex. 9 | Ex. 10 | Comp Ex. 7 |
| After 1 day | 4.5 | 4.0 | 3.5 |
| After 7 days | 4.5 | 4.0 | 2.5 |
| After 30 days | 3.5 | 4.0 | 1.0 |

What is claimed is:

1. A method of retarding the hardening of a cement by contacting the cement with a cement retardant comprising a polymer having an anionic group which can form a chelate with a divalent metal ion and a hydrophilic segment, wherein said polymer comprises a polymerizable macromolecule having an anionic group or a polymerizable macromolecule which can generate the anionic group.

2. A cement retardative sheet wherein a cement retarder is applied to at least one surface of said sheet, and the cement retarder comprises a polymer having an anionic group which can form a chelate with a divalent metal ion and a hydrophilic segment, and wherein said polymer comprises a polymerizable macromolecule having an anionic group or a polymerizable macromolecule which can generate the anionic group.

3. A cement retardative sheet as claimed in claim 2, wherein said sheet comprises a sheet composed of the cement retarder, or a sheet comprising a base sheet wherein the cement retarder is applied to at least one surface of the base sheet.

4. A cement retardative sheet as claimed in claim 3, wherein the surface of said cement retardative sheet is imparted with tacky adhesive properties.

5. A decorative kit sheet comprising the cement retardative sheet of claim 4 and a plurality of decorative members fixed on the tacky adhesive surface of said cement retardative sheet.

6. A method for producing a dressing-finished concrete product which comprises the steps of:

(1) laying the cement retardative sheet of claim 4 in a mould with the tacky adhesive surface facing upwards, and arranging a plurality of decorative members by adhering the front face of the decorative members onto the tacky adhesive surface, (2) casting and curing an inorganic hardenable composition in the mould, (3) removing the hardened product from the mould and removing the tacky adhesive sheet to expose the surface of the decorative members, and (4) washing the surface of the decorative members with water.

7. A method for producing a dressing finished concrete product which comprises the steps of:

(1) laying the decorative kit sheet of claim 5 in a mould with the reverse side of the decorative member facing upwards, (2) casting and curing an inorganic hardenable composition in the mould, (3) removing the hardened product from the mould and removing the tacky adhesive sheet to expose the surface of the decorative members, and (4) washing the surface of the decorative members with water.

* * * * *